United States Patent
Heo et al.

(10) Patent No.: US 10,033,061 B2
(45) Date of Patent: *Jul. 24, 2018

(54) END PLATE FOR FUEL CELL

(71) Applicant: Hyundai Motor Company, Seoul (KR)

(72) Inventors: Yong Suk Heo, Seoul (KR); Jung Do Suh, Seoul (KR); Duck Whan Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 218 days.

This patent is subject to a terminal disclaimer.

(21) Appl. No.: 14/488,716

(22) Filed: Sep. 17, 2014

(65) Prior Publication Data

US 2015/0303493 A1 Oct. 22, 2015

(30) Foreign Application Priority Data

Apr. 16, 2014 (KR) .................. 10-2014-0045638

(51) Int. Cl.
*H01M 8/00* (2016.01)
*H01M 8/248* (2016.01)
*H01M 8/0202* (2016.01)
*H01M 8/0273* (2016.01)
*H01M 8/028* (2016.01)

(52) U.S. Cl.
CPC ......... *H01M 8/248* (2013.01); *H01M 8/0202* (2013.01); *H01M 8/028* (2013.01); *H01M 8/0273* (2013.01)

(58) Field of Classification Search
CPC .. H01M 8/0271; H01M 8/248; H01M 8/0202; H01M 8/0273; H01M 8/028
See application file for complete search history.

(56) References Cited

U.S. PATENT DOCUMENTS

| | | | | |
|---|---|---|---|---|
| 6,372,372 B1* | 4/2002 | D'Aleo | ............... | H01M 8/2485 |
| | | | | 429/434 |
| 9,172,096 B2* | 10/2015 | Suh | ...................... | H01M 8/0221 |
| 9,263,759 B2* | 2/2016 | Suh | ...................... | H01M 8/248 |
| 2006/0204824 A1* | 9/2006 | Mazza | ............... | H01M 8/0206 |
| | | | | 429/434 |
| 2007/0224484 A1* | 9/2007 | Kamo | ............... | H01M 8/04186 |
| | | | | 429/444 |
| 2008/0305388 A1* | 12/2008 | Haussman | ............ | H01M 2/105 |
| | | | | 429/120 |
| 2013/0065157 A1* | 3/2013 | Suh | ...................... | H01M 8/0221 |
| | | | | 429/510 |

FOREIGN PATENT DOCUMENTS

| | | |
|---|---|---|
| JP | 2006-134802 A | 5/2006 |
| JP | 2006179455 A | 7/2006 |
| KR | 10-2001-0030856 A | 4/2001 |
| KR | 10-2005-0109851 | 11/2005 |
| KR | 10-2009-0028941 | 3/2009 |
| KR | 10-2009-0126979 | 12/2009 |
| KR | 10-2012-0051109 | 5/2012 |
| KR | 10-2013-0027743 A | 3/2013 |

* cited by examiner

*Primary Examiner* — Nicholas P D'Aniello
(74) *Attorney, Agent, or Firm* — Mintz Levin Cohn Ferris Glovsky and Popeo, P.C.; Peter F. Corless

(57) ABSTRACT

An end plate for a fuel cell is provided in which a main block is configured to form a body and support a fuel cell at a predetermined pressure and a subplate is configured to include a material having reducibility higher than that of the main block and to adhere to one side of the main block. Additionally, an insulating part encloses the main block and the subplate.

10 Claims, 3 Drawing Sheets

END PLATE FOR FUEL CELL

CROSS REFERENCE TO RELATED APPLICATION

The present application claims priority of Korean Patent Application Number 10-2014-0045638 filed on Apr. 16, 2014, the entire contents of which application are incorporated herein for all purposes by this reference.

BACKGROUND OF THE INVENTION

1. Technical Field

The present invention relates to an end plate for a fuel cell, and more particularly, to an end plate for a fuel cell including a support body as a main part of the fuel cell and a metal body having different reducibility from the support body to reduce a weight and prevent the support body from oxidizing.

2. Description of the Related Art

Generally, a fuel cell stack has a structure in which a plurality of fuel cells are stacked and both ends of the stacked fuel cells are provided with a pair of end plates to press and fix the fuel cells together. Each of the fuel cells of the fuel cell stack maintains a surface pressure and a frictional contact state to each other by the pair of end plates and therefore the pair of end plates needs to maintain sufficient rigidity so as to continuously press/hold the fuel cell together.

According to the related art, the end plate has been manufactured via a monocoque method of completing an end plate by cutting one steel block as illustrated in FIG. 1 and a sandwich method of forming one end plate by riveting or film-adhering four steel panels as illustrated in FIG. 2. However, the monocoque method has a disadvantage in that it is unsuitable for mass production of the end plate since manufacturing costs are expensive and manufacturing time is long and the sandwich method has a disadvantage in that a manufacturing process of the end plate may be complicated and the end plate may have non-uniform rigidity depending on a bonding quality. Further, the monocoque method and the sandwich method have a disadvantage in that a weight of the end plate may be heavy and the end plate may be vulnerable to corrosion since all the parts of the end plate are made of steel.

In a related art entitled "End Plate of Fuel Cell and Manufacturing Method of the Same", "an end plate for a fuel cell including glass fiber and synthetic resin added with plate-shaped nano clay particles and impregnated into the glass fiber" to obtain reinforced strength and mechanical and thermal physical properties has been introduced.

However, this related art fails to solve all of the forgoing disadvantages as well.

The matters described as the related art have been provided only for assisting in the understanding for the background of the present invention and should not be considered as corresponding to the related art known to those skilled in the art.

SUMMARY OF THE INVENTION

An object of the present invention is to provide an end plate for a fuel cell capable of preventing the end plate from corroding by stacking materials having different reducibilities on each other.

According to an exemplary embodiment of the present invention, there is provided an end plate for a fuel cell, including: a main block configured to form a body and support a fuel cell at a pressure; a subplate configured to include a material having reducibility higher than that of the main block and adhere to one side of the main block; and an insulating part configured to enclose the main block and the subplate.

The end plate for a fuel cell may further include: a current collection panel configured to be provided on one side of the main block and have one side adhering to the insulating part and the other side contacting the fuel cell. A position corresponding to the current collection panel in the subplate may be provided with a through aperture having a shape corresponding to the current collection panel. An inner circumferential surface of the through aperture may be spaced apart from an outer circumferential surface of the current collection panel at a preset distance. This preset distance may be equal to a thickness of the insulating part.

A position corresponding to the current collection panel in the insulating part may be provided with an insertion groove corresponding to a shape of the current collection panel to make the current collection panel be inserted thereinto.

A thickness of a portion between the current collection panel and the main block in the insulating part may be equal to that of the remaining portion other than the portion between the current collection panel and the main block. Furthermore, a thickness of the subplate may be equal to that of the current collection panel.

In exemplary embodiments of the present invention, the main block may be made of steel and the subplate may be made of aluminum. The insulating part may be subjected to insert injection to enclose the main block and the subplate.

One side of the current collection panel may be provided with protrusions to transfer collected electricity to the outside and the main block and the insulating part may be provided with insertion holes into which the protrusions are inserted. The insulating part may include a PPA resin component.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an end plate for a fuel cell according to an exemplary embodiment of the present invention will be described with reference to the accompanying drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
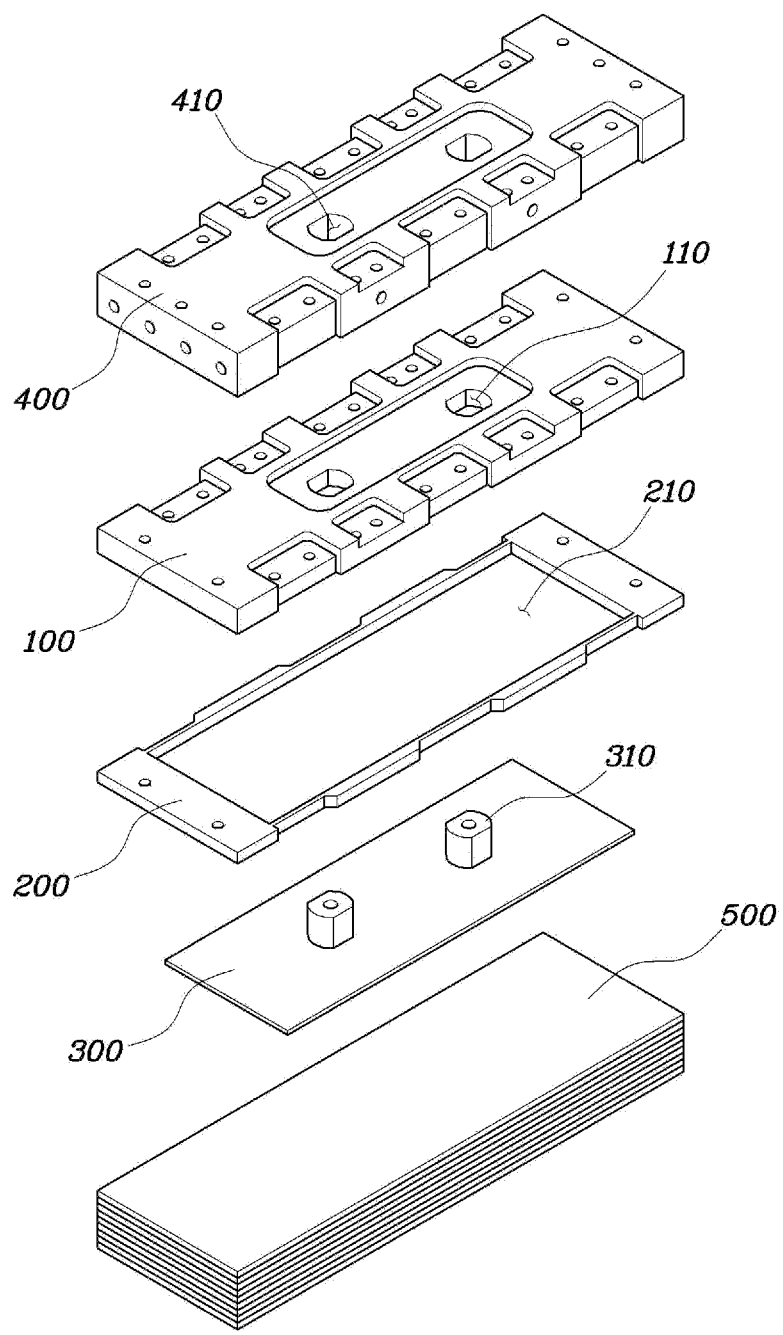
FIG. 1 is an exploded view of an end plate for a fuel cell according to an exemplary embodiment of the present invention.
Figure 2:
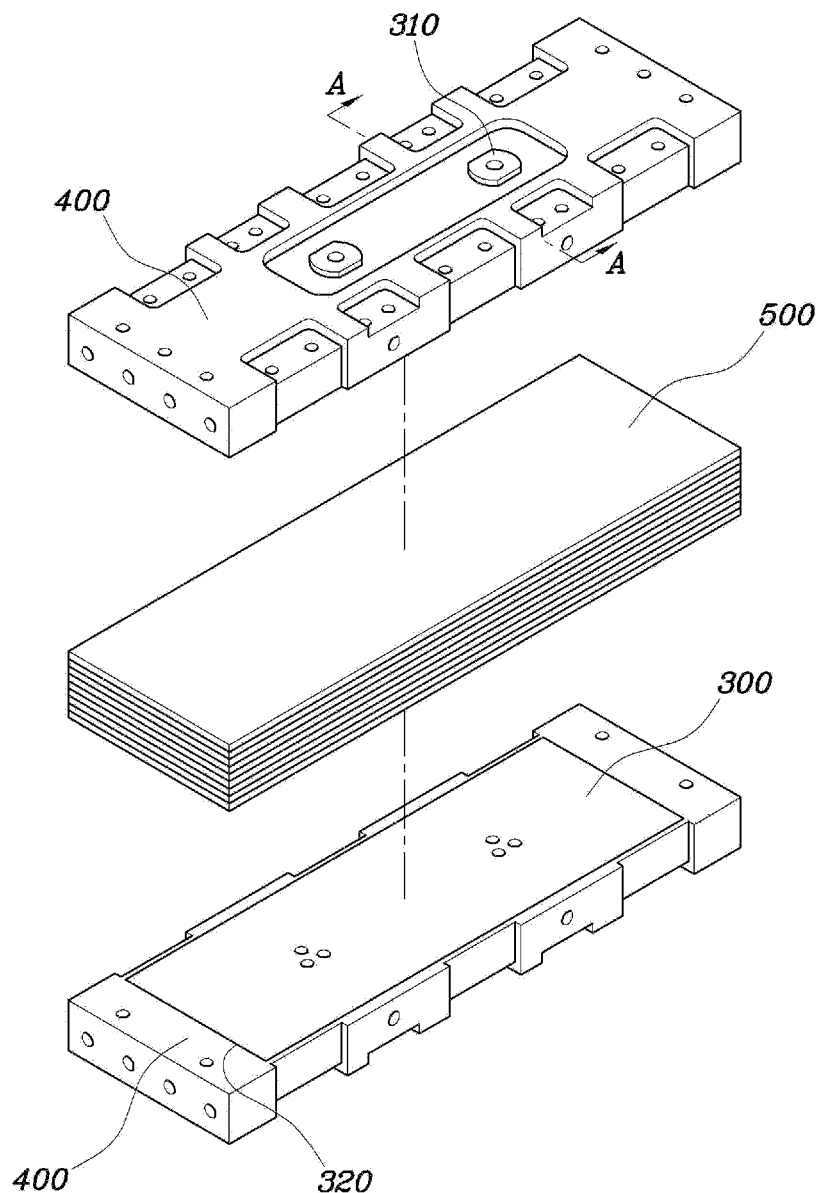
FIG. 2 is an assembly diagram of the end plate for a fuel cell according to the exemplary embodiment of the present invention.

FIG. 1 is an exploded view of an end plate for a fuel cell according to an exemplary embodiment of the present invention and FIG. 2 is an assembly diagram of the end plate for a fuel cell according to the exemplary embodiment of the present invention, in which the end plate for a fuel cell according to the exemplary embodiment of the present invention includes: a main block 100 configured to form a body and support a fuel cell 500 at a predetermined pressure. A subplate 200 may be configured to include a material having reducibility higher than that of the main block 100 and adhere to one side of the main block 100. An insulating part 400 is configured to enclose the main block 100 and the subplate 200.

Since the subplate 200 has reducibility that is higher than that of the main block 100, instead of the main block 100, the subplate 200 is oxidized due to galvanic corrosion, and as a result the main block 100 is prevented from corroding, thereby increasing a lifespan of the main block 100 and preventing a deterioration in rigidity of the main block 100.

Herein, the reducibilities may be compared with each other by various means but may be compared by an oxidation-reduction potential value of a material. That is, the subplate 200 is made of a material having the lower reduction potential value than that of a material forming the main block 100.

In particular, the main block 100 may be made of steel and the subplate 200 may be made of aluminum. Since the subplate 200 supports a load applied to the fuel cell 500 along with the main block 100, compared with the typical end plate made only of steel, the overall rigidity of the end plate may be maintained or increased. Additionally, a weight thereof may be reduced.

Describing in detail a structure of the end plate for a fuel cell according to the exemplary embodiment of the present invention, the end plate for a fuel cell according to the exemplary embodiment of the present invention may further includes a current collection panel 300 which is provided at one side of the main block 100 and has one side adhering to the insulating part 400 and another side contacting the fuel cell 500. The current collection panel 300 serves to transfer a current generated from the fuel cell 500 to the outside and keeps insulated from a vehicle body by the insulating part 400.

A position corresponding to the current collection panel 300 in the insulating part 400, in detail, a position at which the current collection panel 300 contacts the insulating part 400, is provided with an insertion groove 320 into which the current collection panel 300 is inserted. The insertion groove 320 is formed to correspond to a shape of the current collection panel 300 to make the current collection panel 300 protrude to the outside of the insulating part 400, thereby concentrating a load on the current collection panel 300 or to depress the current collection panel 300 into the inside of the insulating part 400. Thus, this makes a contact between the current collection panel 300 and the fuel cell 500.

Meanwhile, a position corresponding to the current collection panel 300 in the subplate 200 may be provided with a through aperture 210 having a shape corresponding to the current collection panel 300. The insulating part 400 may be subjected to insert injection to enclose the main block 100 and the subplate 200.

The insulating part 400 may be subjected to insert injection when the main block 100 and the subplate 200 adhere to each other to be in an integrated module, and thus is formed to enclose outer circumferential surfaces of the main block 100 and the subplate 200 and a thickness of a portion at which the through hole 210 is formed is larger than that of the other remaining portion and therefore a thickness of a portion corresponding to the insertion groove 320 may be prevented from a relatively thinner due to the formation of the insertion groove 320.

Figure 3:
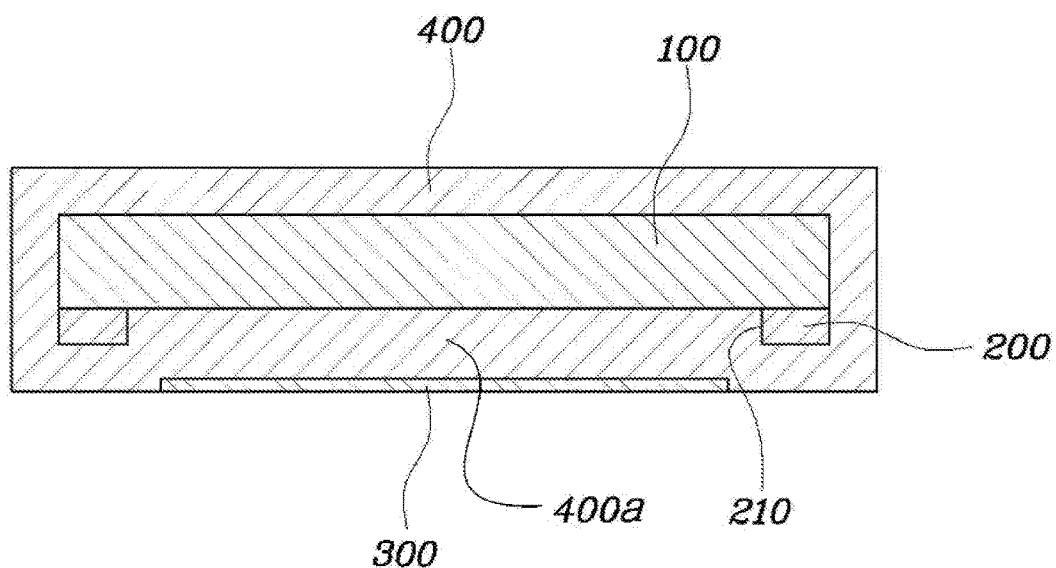
FIG. 3 is a schematic cross-sectional view taken along the line A-A' of FIG. 2.

Preferably, as illustrated in FIG. 3, a thickness of a portion between the current collection panel 300 and the main block 100 in the insulating part 400 may be set to be equal to that of the remaining portion other than the portion between the current collection panel 300 and the main block 100. The reason is that the occurrence rate of fault may be reduced when the insulating part is injection molded at a constant thickness. Further, a difference in the thickness may also occur according to a designer's intention.

More preferably, an inner circumferential surface of the through aperture 210 may be formed to be spaced apart from an outer circumferential surface of the current collection panel 300 at a preset distance. This is to maintain the thickness constant when the insulating part 400 is injection molded. Therefore, the preset distance may be equal to the thickness of the insulating part. Further, the difference in the thickness may also occur according to the designer's intention.

Further, the thickness of the subplate 200 may be set to be equal to that of the current collection panel 300. The reason is that in the insulating part 400, a depth depressed by the insertion groove 320 is equal to a height protruding by the through aperture 210 and thus the thickness of the insulating part 400 may be constant.

Meanwhile, as illustrated in FIG. 3, the main block 100 and the subplate 200 are configured to adhere to each other without a separate bonding means and are enclosed by the insulating part 400 and a lower side portion 400a of the insulating part 400 to maintain the adhering state. The thickness of the insulating part 400 is generally constant without being thinned at a specific portion and may be stably fixed without the bonding means. As a result, a bonding process is not required and therefore a manufacturing process may be simplified and productivity may be improved.

Meanwhile, as illustrated in FIG. 1, one side of the current collection panel 300 is provided with protrusions 310 to transfer collected electricity to the outside and the main block 100 and the insulating part 400 may be provided with insertion holes 110 and 410 into which the protrusions 310 are inserted.

In addition, the insulating part 400 may be formed to include a polyphthalamide (PPA) resin component which has high electricity insulation, low hygroscopicity, and large resistance against high temperature, such that the main block 100 and the subplate 200 may be prevented from being oxidized due to water absorption and heat generation of the fuel cell 500.

According to the end plate for a fuel cell having the structure as described above, the main block 100 may be prevented from corroding, thereby increasing the lifespan of the main block 100 and preventing the rigidity of the main block 100 from reducing due to corrosion.

Further, the main block 100 may adhere to the sub plate without the bonding process between the main block 100 and the subplate 200 by covering the insulating part 400, thereby simplifying the manufacturing process and increasing the production efficiency.

Further, the insulating part 400 may be maintained at a uniform thickness by the through hole 210 which is formed on the subplate 200, thereby preventing the deterioration in quality.

Meanwhile, although specific examples of the present invention have been described above in detail, it is obvious to those skilled in the art that various modifications and alterations may be made without departing from the spirit and scope of the present invention. In addition, it is obvious that these modifications and alterations are within the following claims.

What is claimed is:

1. An end plate for a fuel cell, comprising:
a main block configured to form a body and support a fuel cell at a pressure;
a subplate configured to include a material having reducibility higher than that of the main block and to adhere to one side of the main block;
an insulating part configured to enclose the main block and the subplate; and
a current collection panel configured to be provided at one side of the main block with a lower side portion of the insulating part interposed between the main block and the current collection panel and have one side adhering to the lower side portion of the insulating part and another side contacting the fuel cell,
wherein a position corresponding to the current collection panel in the subplate is provided with a through aperture having a shape corresponding to a shape of a base surface of the current collection panel, and the through aperture of the subplate is filled with the lower side portion of the insulating part, and
wherein a predetermined interval between the subplate and the current collection panel is shorter than that between the main block and the current collection panel such that the subplate performs reducibility higher than that of the main block.

2. The end plate for a fuel cell of claim 1, wherein an inner circumferential surface of the through aperture is spaced apart from an outer circumferential surface of the current collection panel at a preset distance.

3. The end plate for a fuel cell of claim 2, wherein the preset distance is equal to a thickness of the insulating part.

4. The end plate for a fuel cell of claim 1, wherein a position corresponding to the current collection panel in the insulating part is provided with an insertion groove corresponding to a shape of the current collection panel to make the current collection panel be inserted thereinto.

5. The end plate for a fuel cell of claim 1, wherein a thickness of a portion between the current collection panel and the main block in the insulating part is equal to that of a remaining portion other than the portion between the current collection panel and the main block.

6. The end plate for a fuel cell of claim 1, wherein a thickness of the subplate is equal to that of the current collection panel.

7. The end plate for a fuel cell of claim 1, wherein the main block is made of steel and the subplate is made of aluminum.

8. The end plate for a fuel cell of claim 1, wherein the insulating part is subjected to insert injection to enclose the main block and the subplate.

9. The end plate for a fuel cell of claim 1, wherein one side of the current collection panel is provided with protrusions to transfer collected electricity to the outside and the main block and the insulating part are provided with insertion holes into which the protrusions are inserted.

10. The end plate for a fuel cell of claim 1, wherein the insulating part includes a polyphthalamide (PPA) resin component.

* * * * *